UNITED STATES PATENT OFFICE.

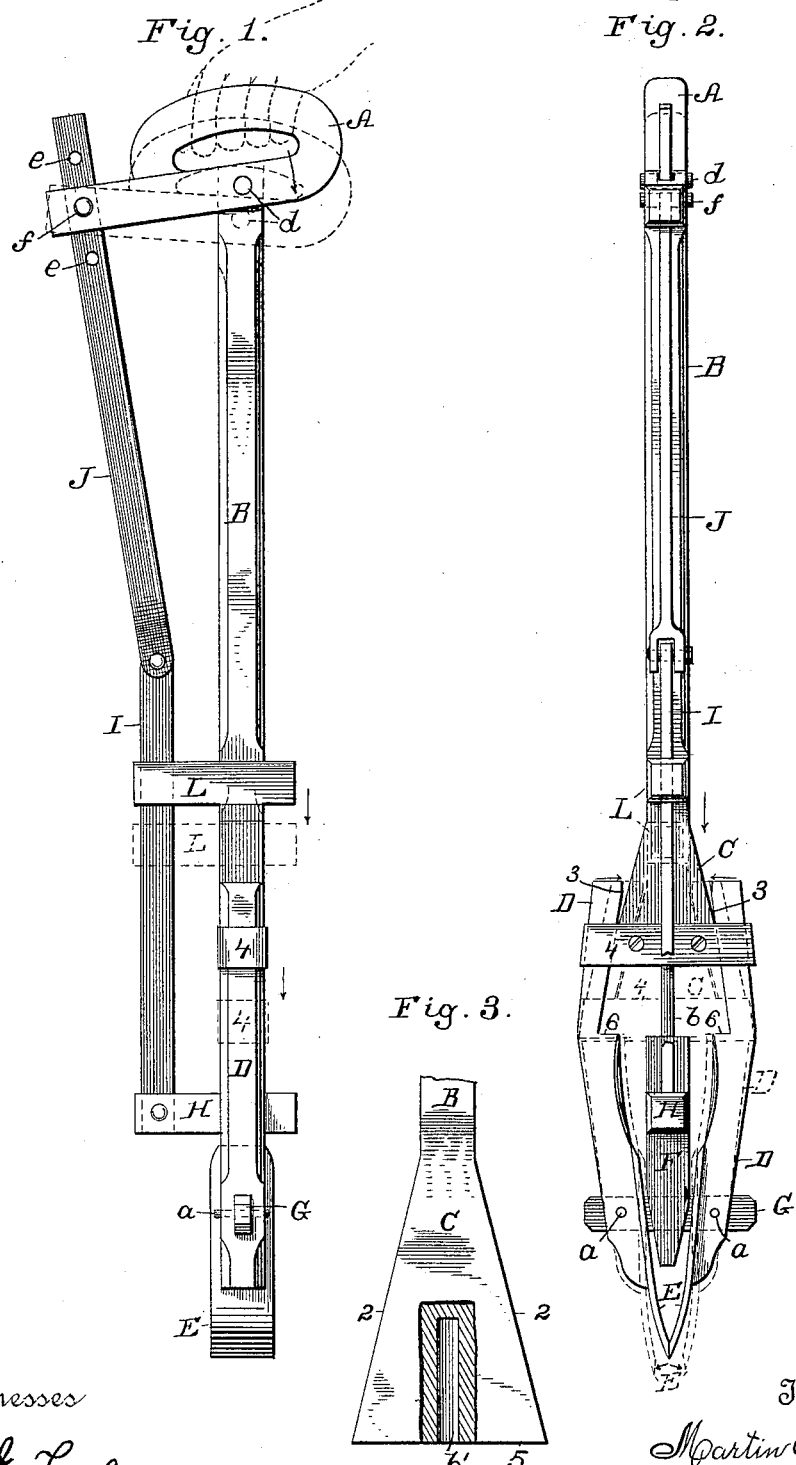

MARTIN E. WHITE, OF WHITE MILLS, KENTUCKY.

PLANT-PULLER.

SPECIFICATION forming part of Letters Patent No. 390,049, dated September 25, 1888.

Application filed April 2, 1888. Serial No. 269,317. (No model.)

*To all whom it may concern:*

Be it known that I, MARTIN E. WHITE, of White Mills, Hardin county, Kentucky, have invented a new and useful Improvement in Plant-Pullers, of which the following is a full, clear, and exact description, reference being had to the accompanying drawings, forming a part hereof.

My invention relates to implements for weeding and thinning plants; and it may be said to consist in the peculiar construction, combination, and arrangement of devices hereinafter set forth, and pointed out in the claims.

In the drawings, which illustrate the manner of carrying out my invention, Figure 1 is a side view of my improved plant-thinner. Fig. 2 is a front view of same, the gripping-jaws being shown in a closed position in each figure; and Fig. 3 is a detail view showing the construction of a wedge used in making up the invention.

The hand-piece A, by means of which the implement is supported and operated, may be of any desired form, and it is pivoted at $d$ to the upper end of the standard B, so that it may oscillate thereon when said standard is raised and lowered during the operation.

Upon the lower end of standard B a wedge, C, having inwardly converging or inclined edges 2, is formed or secured in some way. It will be understood that the gripping-jaws E rest upon the ground during the gripping operation and are supported thereby. The forward end of the handle A is pivoted at $f$ to the upper end of a connecting bar or rod, J, and a vertical stationary bar, I, has its upper end connected to the lower end of said bar J. The lower end of bar I is permanently secured to a horizontal bracket, H, projecting from one side of the central bar, F, and the clamping-jaws D are pivoted at or near their lower ends to a short cross-bar, G, carried by central bar, F, the gripping-jaws E being attached to opposite lower ends of clamping-jaws D, so that when the upper ends of said clamping-jaws are spread apart by raising the wedge C said gripping-jaws will be closed together, as indicated by dotted lines in Figs. 1 and 2.

The operation is as follows: The operator takes the implement in his hand somewhat as he would a walking-cane, and the clamping-jaws E are opened by pressing the standard B downwardly, and then said jaws are placed astride the plant to be pulled. In Figs. 1 and 2 the standard is shown elevated and jaws closed. Then by raising the standard B, with said jaws resting upon the ground, the inclined edges 2 of wedge C force the upper ends of arms D outwardly and cause said clamping jaws to close upon the plant, when, by raising the entire implement, said plant will be uprooted and can be discharged from the gripping-jaws by again opening them, which is done by simply oscillating the hand-piece A, thereby forcing down a guiding-strap, 4, which is attached to the sides of the wedge C, and encircles it and also the upper ends of arms D, as shown. This strap also prevents said arms from spreading too far apart and holds them in proper relation to the inclined edges of said wedge. The downward movement of wedge C is limited by contact with shoulders 6 upon the inner edges of clamping-arms D, the upward movement being limited by contact of the clamping-jaws E with each other. A guiding pin or rod, $b$, is firmly secured in the upper end of central bar, I, and its upper end is engaged by a passage, B′, in the lower end of wedge C. The purpose of this guiding-pin is to hold clamping-arms D, the central bar, I, and the wedge C in proper relative position, such parts, taken all together, forming the main frame of the implement. By means of a series of holes, $e$, in upper end of connecting-bar J, the normal position of handle A and its relation to bar B can be changed by moving pin or bolt $f$ from one hole to another.

Having thus described my invention, what I claim is—

1. An implement for weeding and thinning plants, consisting of a vertically-movable standard, opposite clamping-jaws attached thereto, a wedge-shaped attachment to said standard, and an encircling band attached to said wedge, whereby said jaws are closed and opened, substantially as described.

2. In an implement for weeding and thinning plants, a vertically-movable standard having a wedge-shaped attachment and encircling band at its lower end, in combination with opposite clamping-jaws operated by said wedge-shaped attachment and said encircling band, substantially as described.

3. In the herein-described implement for weeding and thinning plants, the oscillating handle A, vertical standard B, wedge C, encircling band 4, and opposite clamping-jaws, D D, all arranged and adapted to operate substantially as described.

In testimony whereof I affix my signature in presence of two witnesses.

MARTIN E. WHITE.

Witnesses:
  CLARA PAYNE,
  KITTIE P. HOOVER.